Oct. 1, 1968  J. E. ANDERSON ET AL  3,404,253

LASER WELDING

Filed Nov. 24, 1964

INVENTORS.
JOHN E. ANDERSON
JOHN E. JACKSON
ROBERT J. BAIRD

BY

ATTORNEY

INVENTORS.
JOHN E. ANDERSON
JOHN E. JACKSON
ROBERT J. BAIRD
BY Dominic J. Gemmell
ATTORNEY

3,404,253
LASER WELDING
John E. Anderson, John E. Jackson, and Robert J. Baird, Indianapolis, Ind., assignors to Union Carbide Corporation, a corporation of New York
Filed Nov. 24, 1964, Ser. No. 413,535
4 Claims. (Cl. 219—121)

ABSTRACT OF THE DISCLOSURE

A process for pulse laser welding by a drill fill technique with energy produced by a laser device. The laser device employs pulse generating means for sequentially firing four radiant energy sources and blocking the generating pulses to each of the four radiant energy sources for a predetermined sequential time interval such that when one radiant energy source is fired, energy is emitted from a laser material onto a workpiece to be welded to create a molten puddle. By controlling the frequency of firing of the radiant energy sources such that the laser energy directed onto the workpiece lies within the range defined by a particular relationship of laser beam intensity at the focused spot, thermal conductivity of the metal, boiling point of metal, original temperature of metal, radiation adsorptivity of the metal at the wave length of the laser beam, thermal diffusivity of metal, length of laser pulse, and diameter of the focused laser spot, the drill fill technique is perfected.

---

This invention relates to laser welding and more particularly to a laser welding process wherein the weld produced has a relatively high depth-to-width ratio and to an electrical circuit for use in such process.

The laser is an extremely powerful heat source that can produce heat transfer intensities several orders of magnitude higher than the usual electric welding arc. The intensities of laser beams must be controlled since it is easily possible to put onto a workpiece more energy than can be conducted into it. This excess intensity results in surface boiling of the material which in turn produces holes instead of welds. Because of the tendency to produce holes rather than welds, investigators in the prior art have always controlled the intensity of the laser so that heat is introduced into the metal by thermal conduction through the metal itself. We have found however that by proper programming of the laser intensity, we can take advantage of the laser's tendency to produce holes so that heat for the laser source is applied directly to the metal at the bottom and sides of the holes and then the hole is allowed to fill in with molten metal before excess vaporization occurs. We have labeled this technique the drill-fill technique.

It is a main object of the present invention to provide a process of making welds having a high depth-to-width ratio with a pulsating laser energy source.

It is another object to provide an electrical circuit capable of energizing the laser heat source in a desired sequence.

These and other objects will become apparent or will be pointed out in the following description and drawings wherein.

In general, the objects of the invention are achieved by a process for welding with the energy produced by a laser, such welding process includes the steps of directing energy from a laser source onto work to be welded to create a molten puddle; and controlling the laser source such that the intensity directed onto the work lies in the range defined by the equation:

$$I = \frac{C(K+0.2)(T_b - T_o)}{E\sqrt{\alpha\theta}\left(1 - e^{-\frac{d}{2\sqrt{\alpha\theta}}}\right)}$$

wherein the lower limit is given when $C=3$ and the upper limit is given when $C=9$ and wherein:

$I$ = laser beam intensity at focused spot (watts/cm.$^2$)
$K$ = thermal conductivity of metal (cal./cm.-sec.-° K.)
$T_b$ = boiling point of metal (° C.)
$T_o$ = original temperature of metal (° C.-room temperature)
$E$ = radiation adsorptivity of the metal at the wave length of the laser beam
$\alpha$ = thermal diffusivity of metal (cm.$^2$/sec.)
$\theta$ = length of laser pulse (sec.)
$d$ = diameter of focused laser spot (cm.)
$C$ = constant that lies between 3 and 9

Our invention is predicated on the discovery of the importance of surface boiling in laser welding. In essentially all other welding heat sources with the exception of the electron beam, the heat transfer intensities are not sufficient to cause boiling on practically all metal surfaces. With a laser surface boiling is common. For example, a laser output of 10 joules at a pulse duration of 0.001 second is easily achieved. This energy causes surfaces boiling for iron, copper and aluminum with good focusing of the laser beam. The presence of surface boiling puts a limit on the amount of heat that can be conducted into the metal and the depth of the molten zone that can be achieved by thermal conduction of heat alone. Heat cannot be conducted into metal at a rate faster than that obtained when the metal surface is maintained at its boiling point. The presence of surface boiling can also cause drilling in the metal. this is caused by the reaction pressure of the vaporized metal leaving the surface.

Figure 4:
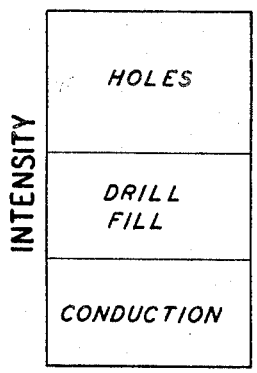
FIGURE 4 is a bar graph of intensity against time indicating the area where the drill-fill technique is achieved.

For a given pulse duration the depth of the molten zone will increase with increasing laser energy up to a limit. As the laser energy is increased further, the pressure will start to build up on the molten surface as metal vaporizes. If the laser energy is increased sufficiently the pressure will cause a gauging or drilling action in which molten metal is pushed aside or violently ejected. Two modes of behavior are possible at this point. The laser can drill a hole leaving little or no remelted metal attached to the base plate after the pulse. This phenomenon is well known in the prior art. In the mode discovered by us, a hole is drilled followed by a filling action of molten metal. The resulting weld bead has an appreciably greater depth than heretofore obtainable. The drill fill mode requires careful control of the energy output of the laser to avoid expulsion of the molten metal. The area where drill fill is achieved is defined by the equation given above and is a narrow area lying between the area of ordinary thermal conduction and the area where holes are produced as shown in FIGURE 4.

In order to achieve the drill-fill technique, many parameters must be taken into consideration. These parameters vary with different metals. As will be noted from the equation, the adsorbitivity of the metal surface and the thermal conductivity of the metal can effect the process.

Figure 1:
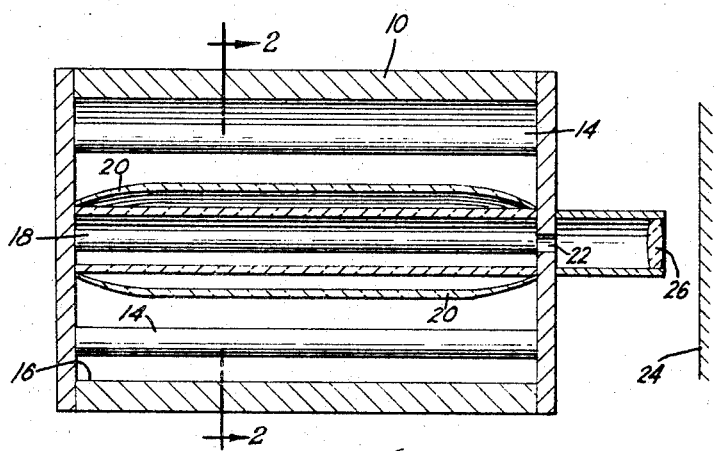
FIGURE 1 is a schematic diagram of exemplary apparatus for practicing the invention.
Figure 2:
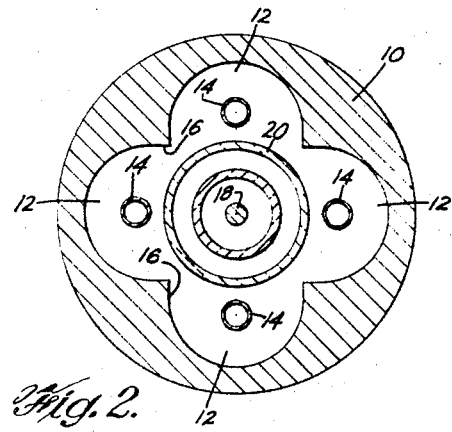
FIGURE 2 is a section taken along the line 2—2 in FIGURE 1.

Referring now to FIGURES 1 and 2, a typical laser for practicing the invention comprises a body 10 preferably constructed of aluminum and having its inner surface 16 highly polished. The body 10 is formed into four partial ellipses 12 such that each has its focal point at crystal 18. Four energy sources 14, which typically may be xenon lamps, are positioned in each ellipse 12. The crystal is a material that is capable of promoting laser action such as, for example, a single crystal of ruby.

Crystal 18 is encased in a glass Dewar 20. Cold nitrogen gas is passed into the Dewar around the crystal through inlet and outlet means, not shown. Condensation on the outer surface of the Dewar and the end 22 of the laser crystal is prevented by passing dry nitrogen gas into cavity 12 and to the end 22 by inlet and outlet means, not shown. Upon being energized through the energy sources 14, a very intense beam of coherent light is emitted from the end 22 of the laser crystal. This intense beam of light is then focused against the workpiece 24 to be welded through lense 26.

As has been described, the intensity level delivered to the work is critical for achieving drill-fill phenomenon.

(2) No. 1 and No. 2—delay No. 3—delay—No. 4 Connect lead 44 to No. 1 and No. 2 multivibrators. Disconnect lead 46 beyond multivibrator No. 1.

(3) No. 1 and No. 2—delay—No. 3 and No. 4. Connect lead 44 to No. 1 and No. 2 multivibrators, disconnect lead 46. Connect lead 48 to both No. 3 and No. 4 multivibrators, disconnect lead 50.

(4) Nos. 1, 2, 3 and 4 (all simultaneously) connect lead 44 to all 4 multivibrators. Disconnect leads 46, 48 and 50.

It should be understood that any number of combinations can be arrived at by proper interchange of leads 44, 46, 48 and 50. Also, it should be understood that all four lamps need not be energized. Any one lamp could be left out merely by not charging the capacitor associated with the particular lamp.

The following data exemplifies the use of the pulsed laser just described to achieve a weld by the drill-fill technique.

| Material | K | $T_b$, °K. | E | $\alpha$ | d, inches | $\theta$, milli-sec. | Tube firing | Voltage, ea. | Measured energy, Joules | I |
|---|---|---|---|---|---|---|---|---|---|---|
| S.S | .05 | 3,100 | .40 | .05 | .020 | 4 | 2-1-1 | 2,000 | 11 | $1.35 \times 10^6$ |
| Al | .53 | 2,330 | .20 | .91 | .020 | 2 | 1-2 | 2,000 | 6.5 | $1.35 \times 10^6$ |
| Cu | .94 | 2,870 | .15 | .91 | .020 | 2 | 2-2 | 2,000 | 10.5 | $2.58 \times 10^6$ |

Accordingly, the sequence by which the laser crystal is energized is important.

Using the apparatus of the type illustrated in FIGURES 1 and 2, all of the lamps 14 may be fired simultaneously, in pairs, or individually according to the power and time needed. For example, assuming that each lamp has a maximum rating of 2000 joules, all 4 lamps would be fired simultaneously if 8000 joules is needed. Or if 3000 joules were needed one lamp could be fired to maximum power simultaneously with another lamp at half power. As another example, if a long time sequence is needed the lamp firings could be sequenced so that the power time curve of the magnitude and time desired.

Figure 3:
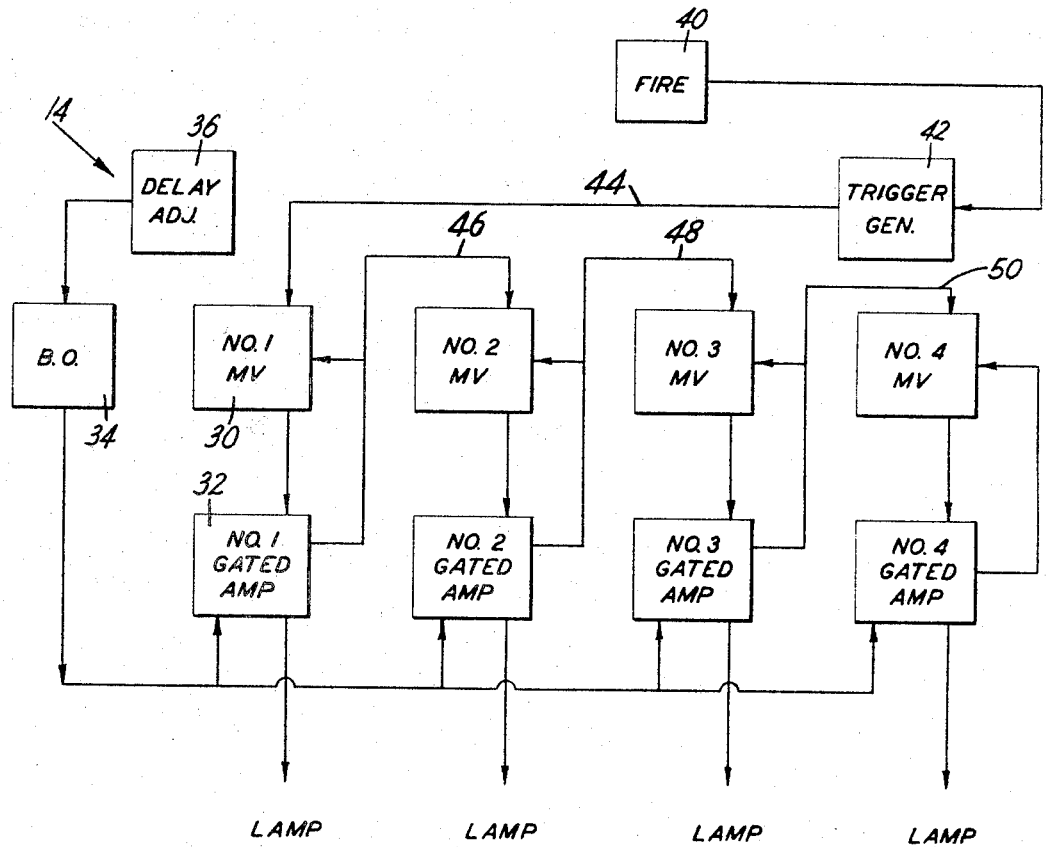
FIGURE 3 is a block diagram of an electric system for controlling the operation of the laser shown in FIGURE 1.

Referring now to FIGURE 3, there is shown a schematic diagram of a novel circuit for achieving desired sequential firing of the lamps 14. In general, sequential firing is provided by a series of bistable multivibrators 30 and gated amplifiers 32. A series of pulses of desired delay spacing is generated by the blocking oscillator 34 having a delay 36. The pulses generated by the blocking oscillator are fed to the inputs of all four gated amplifiers. At this point, however, no output to the lamps is present since the bistable multivibrator has the amplifier cut off. To fire the lamps, fire switch 40 is depressed which closes a mercury wetted relay in trigger generator 42 thus producing a single pulse. This pulse is fed to the No. 1 multivibrator and causes it to switch to its other stable condition. The increased voltage or gate thus produced is fed to the No. 1 gated amplifier which turns it on so that the next pulse or trigger arriving from the blocking oscillator is passed and fires No. 1 lamp. The passed pulse is also fed back to the No. 1 multivibrator to reset it to its original condition. In addition, it is fed ahead to the No. 2 multivibrator to switch it and turn on the No. 2 gated amplifier for the next pulse. This sequence is maintained until all four lamps have been fired and all multivibrators reset. No further triggers or pulses are passed by the amplifiers until a new starting trigger is produced by the trigger generator after the fire switch is released and then depressed again.

Other than a four lamp sequence such as just discussed can be easily obtained by providing a sequence switch (not shown) that changes lead connection 44 for the pulse coming from the trigger generator. Four sequences that could be provided are for example:

(1) No. 1—delay—No. 2—delay—No. 3—delay—No. 4. This is the connection just described.

While the invention has been described with reference to a preferred embodiment for carrying out such invention, modifications can be made to such embodiment without departing from the spirit and scope of the invention.

What is claimed is:

1. A process for pulse laser welding by a drill fill technique with energy produced by a laser, such welding comprising the steps of directing energy from a laser source onto work to be welded to create a molten puddle; controlling the laser source such that the energy intensity directed onto the work lies in the range defined by the equation:

$$I = \frac{C(K+0.2)(T_b - T_o)}{E\sqrt{\alpha\theta}\left(1 - e^{-\frac{d}{2\sqrt{\alpha\theta}}}\right)}$$

wherein the lower limit of the intensity is given when $C=3$ and the upper limit of the intensity is given when $C=9$ and wherein:

$I$ = laser beam intensity at focused spot (watts/cm.²)
$K$ = thermal conductivity of metal (cal./cm.-sec.-° K.)
$T_b$ = boiling point of metal (° C.)
$T_o$ = original temperature of metal (° C.-room temperature)
$E$ = radiation adsorptivity of the metal at the wave length of the laser beam
$\alpha$ = thermal diffusivity of metal (cm.²/sec.)
$\theta$ = length of laser pulse (sec.)
$d$ = diameter of focused laser spot (cm.).

2. A process for pulse laser welding by a drill fill technique with energy produced by a laser, such welding comprising sequentially firing a radiant energy source; directing said radiant energy source at a laser material; focusing the energy emitted from said laser material onto the work to be welded to create a molten puddle; controlling the sequence of firing of said radiant energy source such that the laser energy directed onto the work lies in the range defined by the equation:

$$I = \frac{C(K+0.2)(T_b - T_o)}{E\sqrt{\alpha\theta}\left(1 - e^{-\frac{d}{2\sqrt{\alpha\theta}}}\right)}$$

wherein the lower limit of the intensity is given when $C=3$ and the upper limit of the intensity is given when $C=9$ and wherein:

$I=$ laser beam intensity at focused spot (watts/cm.²)
$K=$ thermal conductivity of metal (cal./cm.-sec.-° K.)
$T_b=$ boiling point of metal (° C.)
$T_o=$ original temperature of metal (° C.-room temperature)
$E=$ radiation adsorptivity of the metal at the wave length of the laser beam
$\alpha=$ thermal diffusivity of metal (cm.²/sec.)
$\theta=$ length of laser pulse (sec.)
$d=$ diameter of focused laser spot (cm.).

3. A process for pulse laser welding by a drill fill technique with energy produced by a laser, such welding comprising generating pulses for sequentially firing a radiant energy source, blocking said generated pulses for a predetermined time interval, firing said radiant energy source after said predetermined time interval, directing said radiant energy source at a laser material, focusing the energy emitted from said laser material onto the work to be welded to create a molten puddle, controlling the sequence of firing of said radiant energy source such that the laser energy directed onto the work lies in the range defined by the equation:

$$I = \frac{C(K+0.2)(T_b - T_o)}{E\sqrt{\alpha\theta}\left(1 - e^{-\frac{d}{2\sqrt{\alpha\theta}}}\right)}$$

wherein the lower limit of the intensity is given when $C=3$ and the upper limit of the intensity is given when $C=9$ and wherein:

$I=$ laser beam intensity at focused spot (watts/cm.²)
$K=$ thermal conductivity of metal (cal./cm.-sec.-° K.)
$T_b=$ boiling point of metal (° C.)
$T_o=$ original temperature of metal (° C.-room temperature)
$E=$ radiation adsorptivity of the metal at the wave length of the laser beam
$\alpha=$ thermal diffusivity of metal (cm.²/sec.)
$\theta=$ length of laser pulse (sec.)
$d=$ diameter of focused laser spot (cm.).

4. A process for pulse laser welding by a drill fill technique with energy produced by a laser, such welding comprising generating pulses for sequentially firing four radiant energy sources, blocking said generated pulses to each of said four radiant energy sources for a predetermined sequential time interval, firing one of said four radiant energy sources, directing said radiant energy source at a laser material, focusing the energy emitted from said laser material onto the work to be welded to create a molten puddle, controlling the sequence of firing of said radiant energy source such that the laser energy directed onto the work lies in the range defined by the equation:

$$I = \frac{C(K+0.2)(T_b - T_o)}{E\sqrt{\alpha\theta}\left(1 - e^{-\frac{d}{2\sqrt{\alpha\theta}}}\right)}$$

wherein the lower limit of the intensity is given when $C=3$ and the upper limit of the intensity is given when $C=9$ and wherein:

$I=$ laser beam intensity at focused spot (watts/cm.²)
$K=$ thermal conductivity of metal (cal./cm.-sec.-° K.)
$T_b=$ boiling point of metal (° C.)
$T_o=$ original temperature of metal (° C.-room temperature)
$E=$ radiation adsorptivity of the metal at the wave length of the laser beam
$\alpha=$ thermal diffusivity of metal (cm.²/sec.)
$\theta=$ length of laser pulse (sec.)
$d=$ diameter of focused laser spot (cm.)

and firing the remainder of said radiant energy source in the same sequence.

References Cited

UNITED STATES PATENTS

| | | | |
|---|---|---|---|
| 3,171,031 | 2/1965 | Yariv | 331—94.5 |
| 3,265,855 | 8/1966 | Norton | 219—121 |
| 3,304,403 | 2/1967 | Harper | 219—121 |
| 3,310,753 | 3/1967 | Burkhalter | 331—94.5 |

FOREIGN PATENTS

| | | |
|---|---|---|
| 966,455 | 8/1964 | Great Britain. |

RICHARD M. WOOD, *Primary Examiner.*

W. D. BROOKS, *Assistant Examiner.*